US012494207B2

(12) United States Patent
Cutler

(10) Patent No.: US 12,494,207 B2
(45) Date of Patent: Dec. 9, 2025

(54) ACTIVE SPEAKER DETECTION USING DISTRIBUTED DEVICES

(71) Applicant: Microsoft Technology Licensing, LLC, Redmond, WA (US)

(72) Inventor: Ross G. Cutler, Clyde Hill, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 251 days.

(21) Appl. No.: 18/211,767

(22) Filed: Jun. 20, 2023

(65) Prior Publication Data

US 2024/0428803 A1    Dec. 26, 2024

(51) Int. Cl.
*G10L 17/22* (2013.01)
*G06V 40/20* (2022.01)

(52) U.S. Cl.
CPC ............ *G10L 17/22* (2013.01); *G06V 40/20* (2022.01)

(58) Field of Classification Search
CPC ......... G06F 3/167; G06F 3/14; G06V 10/763; G06V 20/40; G06V 40/16; G06V 40/20; G06V 40/67; G06V 40/161; G06V 40/193; G06V 40/28; G10K 11/16; G10L 15/1822; G10L 17/00; G10L 17/02; G10L 17/04; G10L 17/18; G10L 17/22; G10L 21/02; G10L 25/51; G10L 15/22; G10L 15/26; G10L 17/14; H04L 12/1822; H04L 65/75; H04L 12/1813; H04L 65/80; H04M 3/563; H04M 1/724; H04M 9/082; H04N 5/268; H04N 7/142; H04N 7/15; H04N 7/155; H04N 21/4223; H04N 21/472; H04N 23/69; H04N 7/147; H04N 21/47202; H04N 23/64; H04N 23/695; G01S 3/8083; G06Q 10/109; G06T 7/11; G06T 7/20; G11B 27/034; H04R 1/406

See application file for complete search history.

(56) References Cited

U.S. PATENT DOCUMENTS 6,219,640 B1 * 4/2001 Basu ...................... G06V 40/16
704/231
6,804,647 B1 * 10/2004 Heck ........................ G10L 17/04
704/270.1

(Continued)

FOREIGN PATENT DOCUMENTS

EP    3751842 A1    12/2020

OTHER PUBLICATIONS

International Search Report and Written Opinion received for PCT Application No. PCT/US2024/033467, mailed on Oct. 9, 2024, 16 pages.

(Continued)

*Primary Examiner* — Gerald Gauthier
(74) *Attorney, Agent, or Firm* — Schwegman Lundberg & Woessner, P.A.

(57) ABSTRACT

This document relates to active speaker detection using distributed devices. For example, the disclosed implementations can employ personal devices of one or more users to detect when those users are speaking during a call with other users. Then, a camera on the personal device can be employed to obtain a front-facing view of the user, which can be provided to other call participants. In some cases, a microphone and/or camera on the user's device are employed to detect when the user is actively speaking.

19 Claims, 12 Drawing Sheets

(56) References Cited

U.S. PATENT DOCUMENTS

| | | | | |
|---|---|---|---|---|
| 7,117,157 | B1* | 10/2006 | Taylor | G06F 3/167 |
| | | | | 704/E15.041 |
| 7,466,334 | B1* | 12/2008 | Baba | G11B 27/034 |
| | | | | 348/E7.083 |
| 8,332,220 | B2* | 12/2012 | Bodin | H04L 65/80 |
| | | | | 704/235 |
| 8,612,211 | B1* | 12/2013 | Shires | G10L 15/26 |
| | | | | 704/235 |
| 8,645,137 | B2* | 2/2014 | Bellegarda | G10L 17/14 |
| | | | | 704/250 |
| 8,683,054 | B1* | 3/2014 | Karakotsios | H04N 23/64 |
| | | | | 709/228 |
| 8,848,021 | B2* | 9/2014 | Duong | H04N 7/15 |
| | | | | 709/204 |
| 8,878,678 | B2* | 11/2014 | Liu | H04M 1/724 |
| | | | | 379/162 |
| 8,885,013 | B2 | 11/2014 | Periyannan et al. | |
| 9,210,269 | B2* | 12/2015 | Liu | H04M 3/563 |
| 9,269,368 | B2* | 2/2016 | Chen | G10L 21/02 |
| 9,385,779 | B2* | 7/2016 | Sun | G10L 25/51 |
| 9,621,795 | B1* | 4/2017 | Whyte | H04R 1/406 |
| 9,742,780 | B2 | 8/2017 | Junuzovic | |
| 9,942,518 | B1* | 4/2018 | Tangeland | G06V 10/763 |
| 9,980,040 | B2* | 5/2018 | Whyte | H04N 23/69 |
| 10,447,970 | B1* | 10/2019 | Chu | H04N 7/147 |
| 10,477,148 | B2* | 11/2019 | Bright-Thomas | H04N 7/152 |
| 11,128,793 | B2* | 9/2021 | Therkelsen | H04N 23/661 |
| 11,477,414 | B2 | 10/2022 | Walters et al. | |
| 11,942,095 | B2* | 3/2024 | Guevara | G10L 17/08 |
| 2003/0090564 | A1* | 5/2003 | Strubbe | H04N 7/142 |
| | | | | 348/E7.083 |
| 2008/0255840 | A1* | 10/2008 | Cutler | H04N 7/15 |
| | | | | 704/E11.003 |
| 2008/0263010 | A1* | 10/2008 | Roychoudhuri | H04M 3/567 |
| | | | | 348/E7.083 |
| 2010/0257462 | A1* | 10/2010 | Barrett | H04N 21/4223 |
| | | | | 715/756 |
| 2011/0035220 | A1* | 2/2011 | Opaluch | G10L 15/26 |
| | | | | 704/E15.001 |
| 2011/0161074 | A1* | 6/2011 | Pance | H04N 7/15 |
| | | | | 704/231 |
| 2011/0288866 | A1* | 11/2011 | Rasmussen | G06Q 10/109 |
| | | | | 704/E15.001 |
| 2013/0120522 | A1* | 5/2013 | Lian | H04N 7/15 |
| | | | | 348/E7.083 |
| 2014/0118472 | A1* | 5/2014 | Liu | H04M 3/563 |
| | | | | 348/14.09 |
| 2014/0278397 | A1* | 9/2014 | Chen | G10L 21/02 |
| | | | | 704/233 |
| 2015/0050967 | A1* | 2/2015 | Bao | H04M 9/082 |
| | | | | 455/570 |
| 2016/0064002 | A1* | 3/2016 | Kim | G01S 3/8083 |
| | | | | 704/246 |
| 2016/0142462 | A1* | 5/2016 | Johnston | G10L 17/00 |
| | | | | 709/205 |
| 2017/0171261 | A1* | 6/2017 | Smus | H04L 65/75 |
| 2018/0376108 | A1* | 12/2018 | Bright-Thomas | G06V 20/40 |
| 2019/0215464 | A1 | 7/2019 | Kumar et al. | |
| 2020/0045095 | A1* | 2/2020 | Paxinos | H04N 21/47202 |
| 2020/0045261 | A1 | 2/2020 | Lim et al. | |
| 2020/0351435 | A1* | 11/2020 | Therkelsen | H04N 7/155 |
| 2022/0076679 | A1* | 3/2022 | Wu | G06V 40/161 |
| 2022/0237735 | A1* | 7/2022 | Zingade | G06V 20/40 |
| 2022/0408015 | A1* | 12/2022 | Wang | H04N 5/268 |
| 2023/0011198 | A1 | 1/2023 | Quinn et al. | |
| 2023/0129467 | A1* | 4/2023 | Singh | G10L 15/1822 |
| | | | | 704/246 |
| 2023/0178083 | A1* | 6/2023 | Sharifi | G10L 15/22 |
| | | | | 704/246 |
| 2023/0186654 | A1* | 6/2023 | Lu | H04N 23/69 |
| | | | | 382/176 |
| 2023/0206621 | A1* | 6/2023 | Ayanoglu | H04L 12/1813 |
| | | | | 382/190 |
| 2023/0231971 | A1* | 7/2023 | Davidson | H04L 12/1822 |
| | | | | 348/14.08 |
| 2023/0267935 | A1* | 8/2023 | Guevara | G10L 17/18 |
| | | | | 704/246 |
| 2023/0274544 | A1* | 8/2023 | Lu | G06T 7/20 |
| 2023/0421702 | A1 | 12/2023 | Cutler | |
| 2024/0106979 | A1* | 3/2024 | Agrawal | G06F 3/14 |
| 2024/0106980 | A1* | 3/2024 | Agrawal | H04N 7/147 |
| 2024/0112497 | A1* | 4/2024 | Xue | G06V 40/28 |
| 2024/0406621 | A1* | 12/2024 | Cutler | G10L 17/02 |
| 2024/0428380 | A1* | 12/2024 | Cutler | G06V 40/67 |
| 2024/0428768 | A1* | 12/2024 | Cutler | G10K 11/16 |
| 2024/0428803 | A1* | 12/2024 | Cutler | G06V 40/20 |

OTHER PUBLICATIONS

Ding, et al., "Personal VAD: Speaker-conditioned voice activity detection", arXiv preprint arXiv:1908.04284, 7pages, 2019.

Cutler, et al., "Multimodal active speaker detection and virtual cinematography for video conferencing", in ICASSP 2020-2020 IEEE International Conference on Acoustics, Speech and Signal Processing, 5 pages, 2020.

Ding, et al., "Personal VAD 2.0: Optimizing Personal Voice Activity Detection for On-Device Speech Recognition", arXiv preprint arXiv:2204.03793, 5pages, 2022.

Kopuklu, et al., "How to design a three-stage architecture for audio-visual active speaker detection in the wild", in Proceedings of the IEEE/CVF International Conference on Computer Vision, 11 pages, 2021.

Viola, et al., "Rapid object detection using a boosted cascade of simple features", in Proceedings of the 2001 IEEE computer society conference on computer vision and pattern recognition, vol. 1, 9 pages, 2001.

Borriello, et al., "Walrus: Wireless Acoustic Location with Room-level Resolution using Ultrasound", in Proceedings of the 3rd International Conference on Mobile Systems, Applications and Services, pp. 191-203, Jun. 6, 2005.

Cutler, et al., "Look who's talking: Speaker detection using video and audio correlation", in 2000 IEEE International Conference on Multimedia and Expo, ICME2000, Proceedings Latest Advances in the Fast Changing World of Multimedia (Cat. No. 00TH8532), vol. 3, pp. 1589-1592, 2000.

Eskimez, et al., "Personalized speech enhancement: New models and comprehensive evaluation", arXiv:2110.09625v1, Oct. 18, 2021, 5 pages.

Indenbom, et al., "Deep model with built-in self-attention alignment for acoustic echo cancellation", arXiv preprint arXiv:2208.11308, Aug. 24, 2022, 5 Pages.

Sun, et al., "Deep learning face representation from predicting 10,000 classes", in Proceedings of the IEEE conference on computer vision and pattern recognition, pp. 1891-1898, 2014.

Turk, et al., "Face recognition using eigenfaces", in Proceedings 1991 IEEE computer society conference on computer vision and pattern recognition, IEEE Computer Society, pp. 586-587, 1991.

Zhang, et al., "Boosting-based multimodal speaker detection for distributed meeting videos", IEEE Transactions on Multimedia, vol. 10, Issue.8, pp. 1541-1552, 2008.

"Manage Attendee Audio and Video Permissions in Teams Meetings", Retrieved from: https://support.microsoft.com/en-us/office/manage-attendee-audio-and-video-permissions-in-teams-meetings-f9db15e1-f46f-46da-95c6-34f9f39e671a, Retrieved Date: Jan. 27, 2023, 8 Pages.

"Pin or Mute Google Meet Participants", Retrieved from: https://support.google.com/meet/answer/7501121?hl=en&co=GENIE.Platform%3DDesktop, Retrieved Date: Jan. 27, 2023, 2 Pages.

Cutler, et al., "Multimodal Active Speaker Detection and Virtual Cinematography for Video Conferencing", In Proceedings of IEEE International Conference on Acoustics, Speech and Signal Processing, May 4, 2020, 5 Pages.

(56) References Cited

OTHER PUBLICATIONS

Zhang, et al., "Boosting-Based Multimodal Speaker Detection for Distributed Meeting Videos", In IEEE Transaction on Multimedia, vol. 10, Issue 4, Dec. 12, 2008, pp. 1-21.

* cited by examiner

CONFERENCE ROOM VIDEO SIGNAL 200

ACTIVE SPEAKER DETECTION USING DISTRIBUTED DEVICES

BACKGROUND

One important use case for computing devices involves teleconferencing, where participants communicate with remote users via audio and/or video over a network. In some cases, multiple users will be co-located together, e.g., in a conference room, and the conference room can have a video camera that provides a video signal to remote devices participating in the call. However, conference room video cameras have certain limitations that constrain the type of user experiences they can provide.

SUMMARY

This Summary is provided to introduce a selection of concepts in a simplified form. These concepts are further described below in the Detailed Description. This Summary is not intended to identify key features or essential features of the claimed subject matter, nor is it intended to be used to limit the scope of the claimed subject matter.

The description generally relates to techniques for distributed teleconferencing. One example includes a method or technique that can be performed by a particular device. The method or technique can include capturing a particular video signal using a particular camera of the particular device. The method or technique can also include, based on at least one of the particular video signal or a particular microphone signal captured by the particular device, detecting that a particular user is actively speaking. The method or technique can also include, responsive to detecting that the particular user is actively speaking, sending an active speaker indication to another device indicating that the particular user is actively speaking. The method or technique can also include sending the particular video signal to the another device, wherein the another device incorporates the particular video signal into a playback signal for playback during a call involving the particular device and at least one remote device.

Another example includes a method or technique that can include obtaining an active speaker indication from a particular device, the active speaker indication conveying that the particular device has detected that a particular user is actively speaking. The method or technique can also include obtaining a particular video signal from the particular device and obtaining a microphone signal from another device that is co-located with the particular device. The method or technique can also include generating a playback signal from the microphone signal and the particular video signal, and sending the playback signal to a remote device that is participating in a call with the particular device.

Another example includes a device having a camera, a microphone, a hardware processing unit, and a storage resource storing computer-readable instructions. When executed by the hardware processing unit, the computer-readable instructions can cause the device to capture a particular video signal using the camera of the device. The computer-readable instructions can also cause the device to, based on at least one of the particular video signal or a particular microphone signal captured by the microphone of the device, detect that a particular user is actively speaking. The computer-readable instructions can also cause the device to, responsive to detecting that the particular user is actively speaking, send an active speaker indication to another device indicating that the particular user is actively speaking. The computer-readable instructions can also cause the device to send the particular video signal to the another device, wherein the another device incorporates the particular video signal into a playback signal for playback during a call involving the device and at least one remote device.

The above listed examples are intended to provide a quick reference to aid the reader and are not intended to define the scope of the concepts described herein.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Overview

Figure 1:
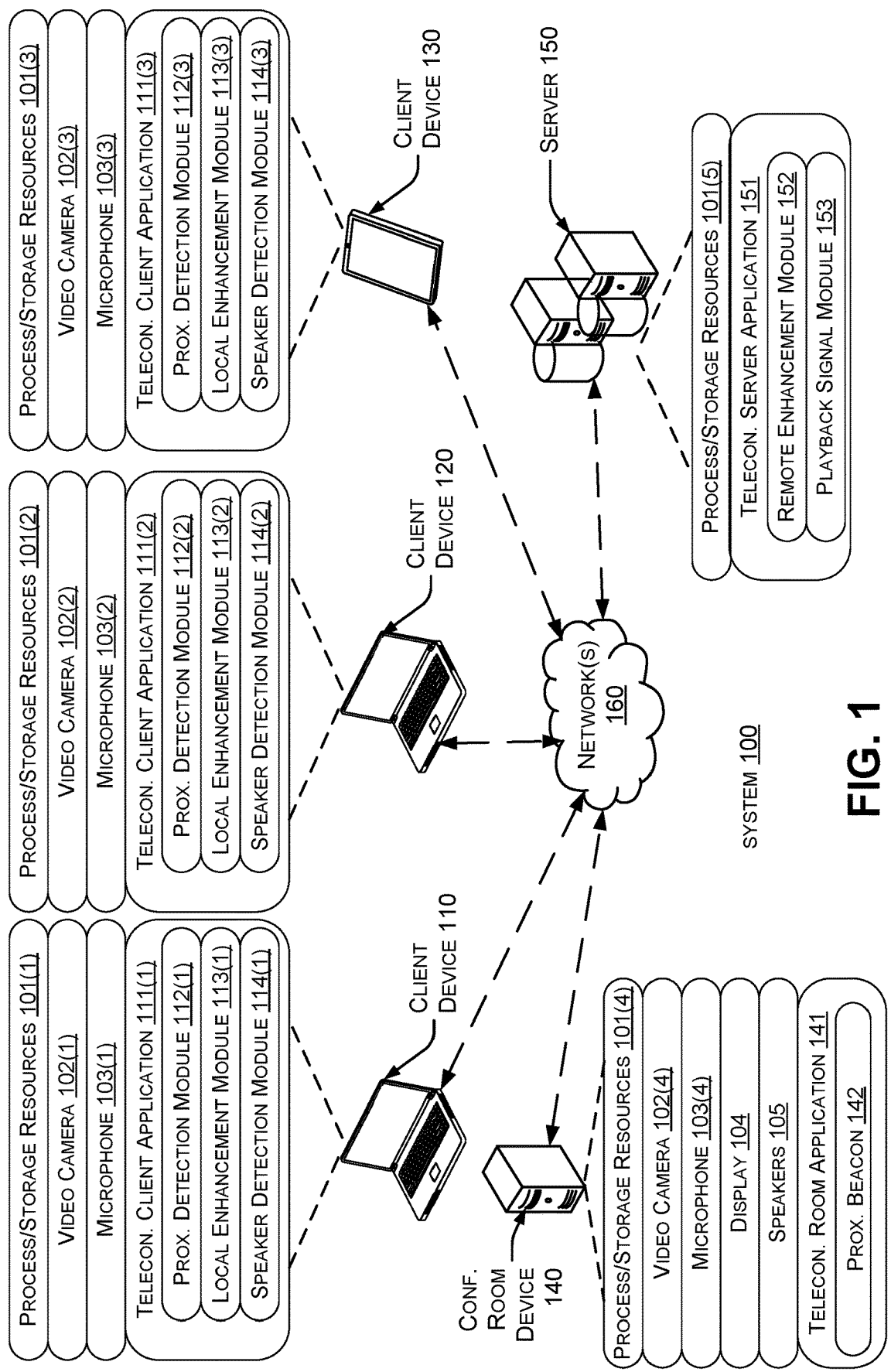
FIG. 1 illustrates an example system, consistent with some implementations of the present concepts.

The disclosed implementations generally offer techniques for enabling high-quality user experiences for teleconferences. In many cases, participants in a teleconference will bring their own personal devices, such as laptops, tablets, or smart phones, into a conference room. These personal devices often have microphones and cameras that allow the users to participate as remote participants in a given teleconference. However, when users are co-located in a conference room, they will often join the conference only by video with their personal devices, relying on the conference room microphone and loudspeaker for audio.

Conference rooms also can have video cameras that record participants in the conference room. The video signal from the conference room video camera can be sent to remote users that are also participating in the call. However, the placement of a video camera in a conference room tends to limit the type of user experiences that can be provided. For example, the resolution of the video camera may be insufficient to capture a high-quality close-up image of a user that is in the conference room. Furthermore, the placement of the video can limit the type of presentation that can be provided, because users generally do not face the conference room video camera, but rather other users in the conference room or the video camera on their own personal device.

The disclosed implementations can employ active speaker detection on user devices. When a given user is determined to be actively speaking by that user's device, the camera on that user's device can be used in place of the conference room camera to obtain a high-resolution view of the user's face, captured from a frontal angle. Thus, other participants in the call can be provided a very natural experience where they are able to look at the face of the active speaker as captured by their personal device, rather than being limited to a view that is obtained from the conference room camera.

Definitions

For the purposes of this document, the term "signal" refers to a function that varies over time or space. A signal can be represented digitally using data samples, such as audio samples, video samples, or one or more pixels of an image. An "enhancement model" refers to a model that processes data samples from an input signal to enhance the perceived quality of the signal. For instance, an enhancement model could remove noise or echoes from audio data, or could sharpen image or video data. The term "personalized enhancement model" refers to an enhancement model that has been adapted to enhance a signal specifically for a given user. For instance, as discussed more below, a personalized audio enhancement model could be adapted to isolate a particular user's voice by attenuating other components of an audio signal produced by other sound sources, such as noises, echoes, or the voices of other users.

The term "mixing," as used herein, refers to combining two or more signals to produce another signal. Mixing can include adding two audio signals together, interleaving individual audio signals in different time slices, adding video signals and audio signals together to create a playback signal, etc. In some cases, audio signals from two co-located devices can be mixed to obtain a playback signal. The term "synchronizing" means aligning two or more signals, e.g., prior to mixing. For instance, two or more microphone signals can be synchronized by identifying corresponding frames in the respective signals and temporally aligning those frames. Likewise, loudspeakers can also be synchronized by identifying and temporally aligning corresponding frames in sounds played back by the loudspeakers. In addition, audio signals can be synchronized to video signals.

The term "co-located," as used herein, means that two devices have been determined to be within proximity to one another according to some criteria, e.g., the devices are within the same room, within a threshold distance of one another, etc. The term "conference room," as used herein, means any room having at least one of a video camera that can be employed to capture video of multiple users participating in a call, and/or a microphone that can be employed to capture audio of multiple users participating in a call. A conference room microphone or video camera can be permanently installed in the conference room, or temporarily placed in the conference room for the duration of the call or longer.

The term "playback signal," as used herein, refers to a signal that can be played back by a loudspeaker, a display, etc. A playback signal can be a combination of one or more microphone signals and one or more video signals. An "enhanced" signal is a signal that has been processed using an enhancement model to improve some signal characteristic of the signal.

The term "signal characteristic" describes how a signal can be perceived by a user, e.g., the overall quality of the signal or a specific aspect of the signal such as how noisy an audio signal is, how blurry an image signal is, etc. The term "quality estimation model" refers to a model that evaluates an input signal to estimate how a human might rate the perceived quality of the input signal for one or more signal characteristics. For example, a first quality estimation model could estimate the speech quality of an audio signal and a second quality estimation model could estimate the overall quality and/or background noise of the same audio signal. Audio quality estimation models can be used to estimate signal characteristics of an unprocessed or raw audio signal or a processed audio signal that has been output by a particular data enhancement model. The output of a quality estimation model can be a synthetic label representing the signal quality of a particular signal characteristic. Here, the term "synthetic label" means a label generated by a machine evaluation of a signal, where a "manual" label is provided by human evaluation of a signal.

The term "model" is used generally herein to refer to a range of processing techniques, and includes models trained using machine learning as well as hand-coded (e.g., heuristic-based) models. For instance, a machine-learning model could be a neural network, a support vector machine, a decision tree, etc. Whether machine-trained or not, data enhancement models can be configured to enhance or otherwise manipulate signals to produce processed signals. Data enhancement models can include codecs or other compression mechanisms, audio noise suppressors, echo removers, distortion removers, image/video healers, low light enhancers, image/video sharpeners, image/video denoisers, etc., as discussed more below.

The term "impairment," as used herein, refers to any characteristic of a signal that reduces the perceived quality of that signal. Thus, for instance, an impairment can include noise or echoes that occur when recording an audio signal, or blur or low-light conditions for images or video. One type of impairment is an artifact, which can be introduced by a data enhancement model when removing impairments from a given signal. Viewed from one perspective, an artifact can be an impairment that is introduced by processing an input signal to remove other impairments. Another type of impairment is a recording device impairment introduced into a raw input signal by a recording device such as a microphone or camera. Another type of impairment is a capture condition impairment introduced by conditions under which a raw input signal is captured, e.g., room reverberation for audio, low light conditions for image/video, etc.

The following discussion also mentions audio devices such as microphones and loudspeakers. Note that a microphone that provides a microphone signal to a computing device can be an integrated component of that device (e.g., included in a device housing) or can be an external microphone in wired or wireless communication with that computing device. Similarly, when a computing device plays back a signal over a loudspeaker, that loudspeaker can be an integrated component of the computing device or in wired or wireless communication with the computing device. In the case of a wired or wireless headset, a microphone and one or more loudspeakers can be integrated into a single peripheral device that sends microphone signals to a corresponding computing device and outputs a playback signal received from the computing device. In addition, note that the term particular" is used herein for clarity, and does not imply any functional or structural limitation."

Machine Learning Overview

There are various types of machine learning frameworks that can be trained to perform a given task, such as detecting when a person is actively speaking, estimating the quality of a signal, enhancing a signal, detecting faces or bodies of users in a video, performing facial recognition of detected faces, etc. Support vector machines, decision trees, and neural networks are just a few examples of machine learning frameworks that have been used in a wide variety of applications, such as image processing and natural language processing. Some machine learning frameworks, such as neural networks, use layers of nodes that perform specific operations.

In a neural network, nodes are connected to one another via one or more edges. A neural network can include an input layer, an output layer, and one or more intermediate layers. Individual nodes can process their respective inputs according to a predefined function, and provide an output to a subsequent layer, or, in some cases, a previous layer. The inputs to a given node can be multiplied by a corresponding weight value for an edge between the input and the node. In addition, nodes can have individual bias values that are also used to produce outputs. Various training procedures can be applied to learn the edge weights and/or bias values. The term "internal parameters" is used herein to refer to learnable values such as edge weights and bias values that can be learned by training a machine learning model, such as a neural network. The term "hyperparameters" is used herein to refer to characteristics of model training, such as learning rate, batch size, number of training epochs, number of hidden layers, activation functions, etc.

A neural network structure can have different layers that perform different specific functions. For example, one or more layers of nodes can collectively perform a specific operation, such as pooling, encoding, or convolution operations. For the purposes of this document, the term "layer" refers to a group of nodes that share inputs and outputs, e.g., to or from external sources or other layers in the network. The term "operation" refers to a function that can be performed by one or more layers of nodes. The term "model structure" refers to an overall architecture of a layered model, including the number of layers, the connectivity of the layers, and the type of operations performed by individual layers. The term "neural network structure" refers to the model structure of a neural network. The term "trained model" and/or "tuned model" refers to a model structure together with internal parameters for the model structure that have been trained or tuned. Note that two trained models can share the same model structure and yet have different values for the internal parameters, e.g., if the two models are trained on different training data or if there are underlying stochastic processes in the training process.

Example System

The present implementations can be performed in various scenarios on various devices. FIG. 1 shows an example system 100 in which the present implementations can be employed, as discussed more below.

As shown in FIG. 1, system 100 includes a client device 110, a client device 120, a client device 130, a conference room device 140, and a server 150, connected by one or more network(s) 160. Note that the client devices and conference room device can be embodied as mobile devices such as smart phones, laptops, or tablets, as well as stationary devices such as desktops, server devices, etc. Likewise, the server can be implemented using various types of computing devices. In some cases, any of the devices shown in FIG. 1, but particularly the server, can be implemented in data centers, server farms, etc.

Certain components of the devices shown in FIG. 1 may be referred to herein by parenthetical reference numbers. For the purposes of the following description, the parenthetical (1) indicates an occurrence of a given component on client device 110, (2) indicates an occurrence of a given component on client device 120, (3) indicates an occurrence of a given component on client device 130, (4) indicates an occurrence of a given component on conference room device 140, and (5) indicates an occurrence on server 150. Unless identifying a specific instance of a given component, this document will refer generally to the components without the parenthetical.

Generally, the devices 110, 120, 130, 140, and 150 may have respective processing/storage resources 101, which are discussed in more detail below. The devices may also have various modules that function using the processing and storage resources to perform the techniques discussed herein. Storage resources can include both persistent storage resources, such as magnetic or solid-state drives, and volatile storage, such as one or more random-access memory devices. In some cases, the modules are provided as executable instructions that are stored on persistent storage devices, loaded into the random-access memory devices, and read from the random-access memory by the processing resources for execution.

Client devices 110, 120, and/or 130 and conference room device 140 can have one or more video cameras 102 and microphones 103. In some cases, the video cameras and/or microphones can be integrated components of their respective devices. In other cases, the video cameras and/or microphones are external devices connected by wired or wireless connections to their respective devices. For instance, the video cameras of the respective client devices could be detachable universal serial bus (USB) web cameras or Bluetooth web cameras, and the microphones of the respective client devices can be incorporated into USB or Bluetooth headsets. The microphone of the conference room device can be provided on a table in a conference room and have a wired or wireless connection to the conference room device. The video camera of the conference room device can be mounted on a wall or ceiling of the conference room and have a wired or wireless connection to the conference room device. In addition, the conference room device can have a display 104 and speakers 105. The display can be mounted on a wall or table in the conference room and have a wired or wireless connection to the conference room device. In some cases, the display of the conference room device can incorporate the conference room microphone, the conference room video camera, and/or the conference room speakers, and in other cases the conference room microphone, camera, and/or speakers are separate from the display. In addition, note that client devices 110, 120, and/or 130 can also have displays and/or speakers (not shown).

Each client device can include respective instances of a teleconferencing client application 111. The teleconferencing client application can provide functionality for allowing users of the client devices to conduct audio teleconferencing with one another, with and/or without video functionality. Each instance of the teleconferencing client application can include a corresponding proximity detection module 112. The proximity detection module can be configured to detect when a given client device is in a conference room as discussed more below.

In some cases, the teleconferencing client application can include a local enhancement model 113. For instance, the local enhancement model can remove noise, echoes, or other impairments from a microphone signal captured by a given client device. In some cases, the local enhancement model can be a general model adapted for multiple users, and in other cases it can be personalized for a particular user of that client device. For instance, as discussed more below, a personalized audio enhancement model could be adapted to filter out noise, echoes, etc., to isolate a particular user's voice by attenuating components of an audio signal produced by other sound source (including the voices of other users), whereas a general audio enhancement model could be adapted to filter out noise and echoes while retaining any human voices.

Speaker detection module 114 can be configured to detect an active speaker. For instance, the speaker detection module can employ microphone and/or video signals to determine when a particular user is speaking. As discussed more below, active speaker detection can involve using a machine learning model, such as a deep neural network or a boosted decision tree.

The conference room device 140 can include a teleconferencing room application 111(4) that can provide functionality for allowing users of the client devices to conduct teleconferences with one another. For example, the teleconferencing room application can automatically join individual client devices to a call when they enter the conference room. For instance, the proximity beacon module 142 on the conference room device can broadcast a beacon signal that is detected by the proximity detection modules on the individual client devices, and the proximity detection module 112 on a given client device can detect the beacon signal and request that the conference room device automatically join that client device to a call. The conference room device can also have a teleconferencing room application 141 that can play back audio or video signals received from server 150.

Teleconferencing server application 151 on server 150 can coordinate calls among the various other devices by communicating with the respective instances of the teleconferencing client application 111 and the teleconferencing room application 141 over network(s) 160. For instance, the teleconferencing server application can have a remote enhancement module 152. The remote enhancement module can perform personalized or non-personalized audio enhancement similarly to the local enhancement module 113 on the respective client devices. The remote enhancement module can also perform video enhancement, e.g., by sharpening a video signal, correcting low-light conditions, performing background removal, etc.

Teleconferencing server application 151 can also have a playback signal module 153 that generates audio and/or video playback signals. For instance, the playback signal module can select, synchronize, and/or mix selected microphone signals from the respective client devices to obtain one or more playback signals, and communicate the playback signals to one or more remote client devices during a call. For video conferencing scenarios, the mixer can also mix video signals together with the audio signals and communicate the mixed video/audio signals to participants in a call.

Note that FIG. 1 illustrates only one of many plausible configurations. For instance, in some cases, speaker detection can be performed on the server 150 instead of the client devices. As another example, peer-to-peer implementations can be provided where one of the client devices performs functionality described herein as occurring on the conference room device 140 or the server 150.

Conference Room Scenario

Figure 2A:
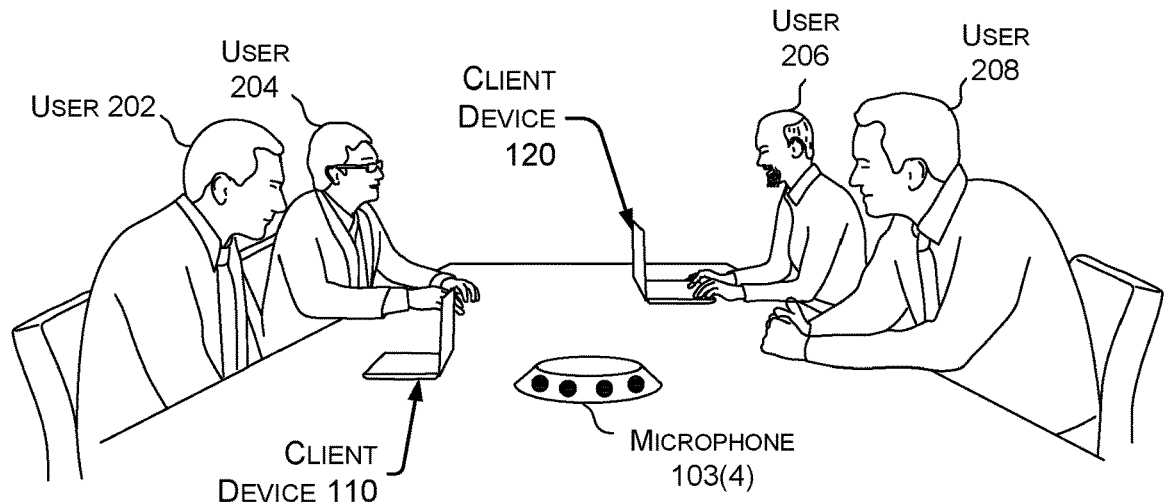
FIG. 2A-2C illustrate an example conference room scenario involving active speaker detection, consistent with some implementations of the present concepts.
Figure 2B:
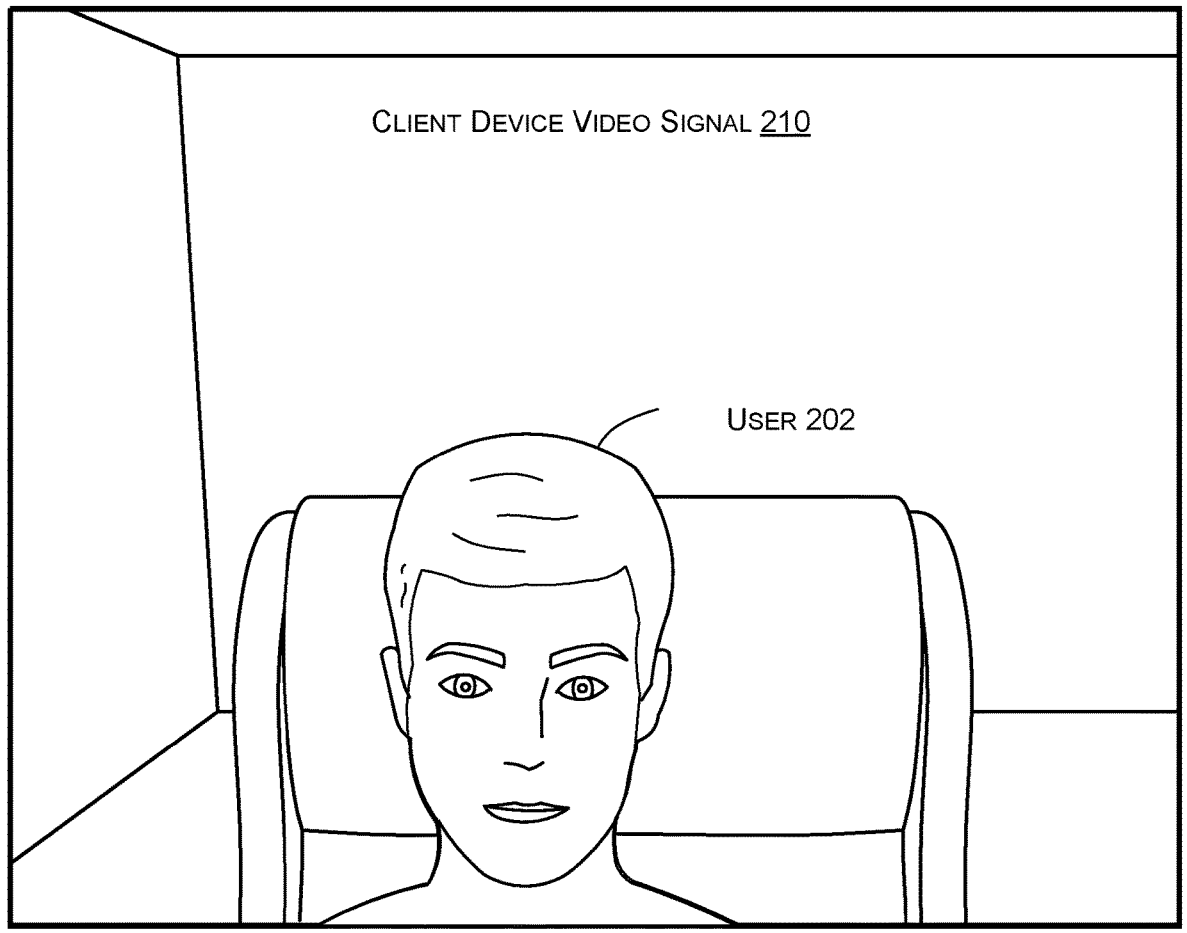
Figure 2C:
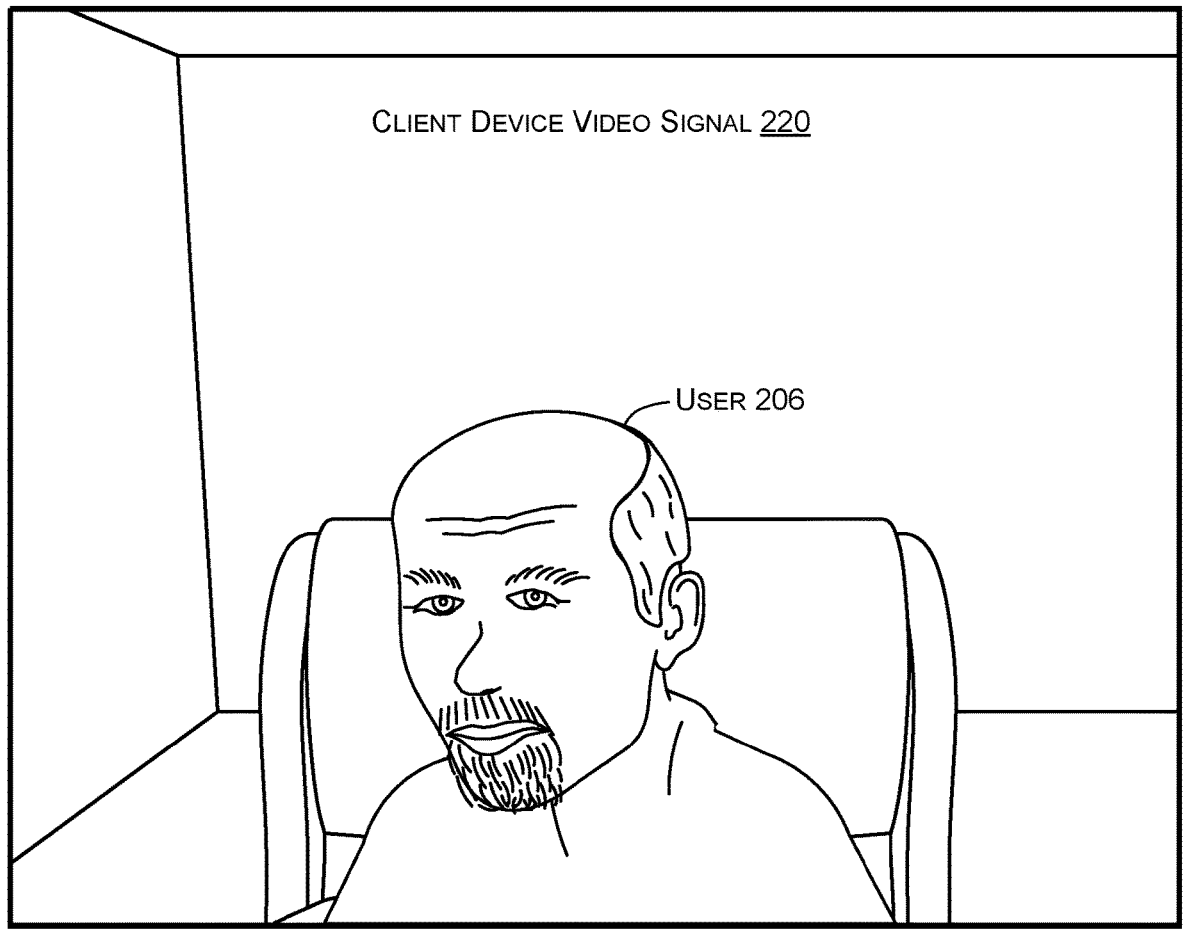

FIGS. 2A-2C collectively show a conference room scenario where active speaker detection is employed to dynamically provide high-quality views of users when they speak during a teleconference.

FIG. 2A shows a conference room video signal 200. Users 202, 204, 206, and 208 are seated around microphone 103(4) of the conference room device 140. User 202 is using client device 110 and user 206 is using client device 120. For instance, the conference room video signal could be captured by video camera 102(4) of the conference room device, which can be mounted in the conference room and facing toward the users. The conference room video signal could be communicated to respective client devices of one or more remote users who are participating in a teleconference with the users in the conference room, and displayed locally on those remote client devices. When remote users speak into their respective remote client devices, their voices could be played back by a loudspeaker in the conference room and output on a display in the conference room, e.g., by the conference room device 140.

Assume that user 202 begins speaking into client device 110 during the teleconference. Client device 110 can detect that user 202 is speaking and capture a client device video signal 210 with a frontal view of user 202, as shown in FIG. 2B. In some cases, the teleconferencing server application 151 can send the conference room video signal 200 to any remote client devices for playback to any remote users. When the teleconferencing server application receives an indication from client device 110 that user 202 is actively speaking, the teleconferencing server application can replace the conference room video signal 200 with client device video signal 210, thus enabling the remote users to see a frontal view of the currently-active speaker, i.e., user 202.

Assume that user 202 stops speaking, and user 206 begins speaking into client device 120 during the teleconference. Client device 120 can detect that user 206 is speaking and capture a client device video signal 220 with a frontal view of user 206, as shown in FIG. 2B. Client device 120 can send an indication to the teleconferencing server application 151 that user 206 is now actively speaking, and in response the teleconferencing server application can replace the client device video signal 210 with the client device video signal 220. Thus, client device video signal 220 can be transmitted for playback to any remote users, thus enabling the remote users to see a frontal view of the currently-active speaker, i.e., user 206.

Referring back to FIG. 1, as noted above, the respective teleconferencing client applications 111 can detect when a given user is actively speaking into a respective client device using speaker detection module 114. Then, the teleconferencing client application can send an active speaker indication to the teleconferencing server application 151 on server 150, as well as a video signal captured by the client device having the active speaker. The teleconferencing server application can incorporate the video signal captured by that client device into a playback signal that is sent to any remote client devices participating in the call. Thus, the remote users can receive high-resolution frontal views of the active speakers from the client devices as they speak. When there is no active speaker in the conference room or the active speaker in the conference room either does not have a client device or is not using video on their client device, the conference room video signal can be sent for playback to the remote devices.

Home Office Scenario

Figure 3A:
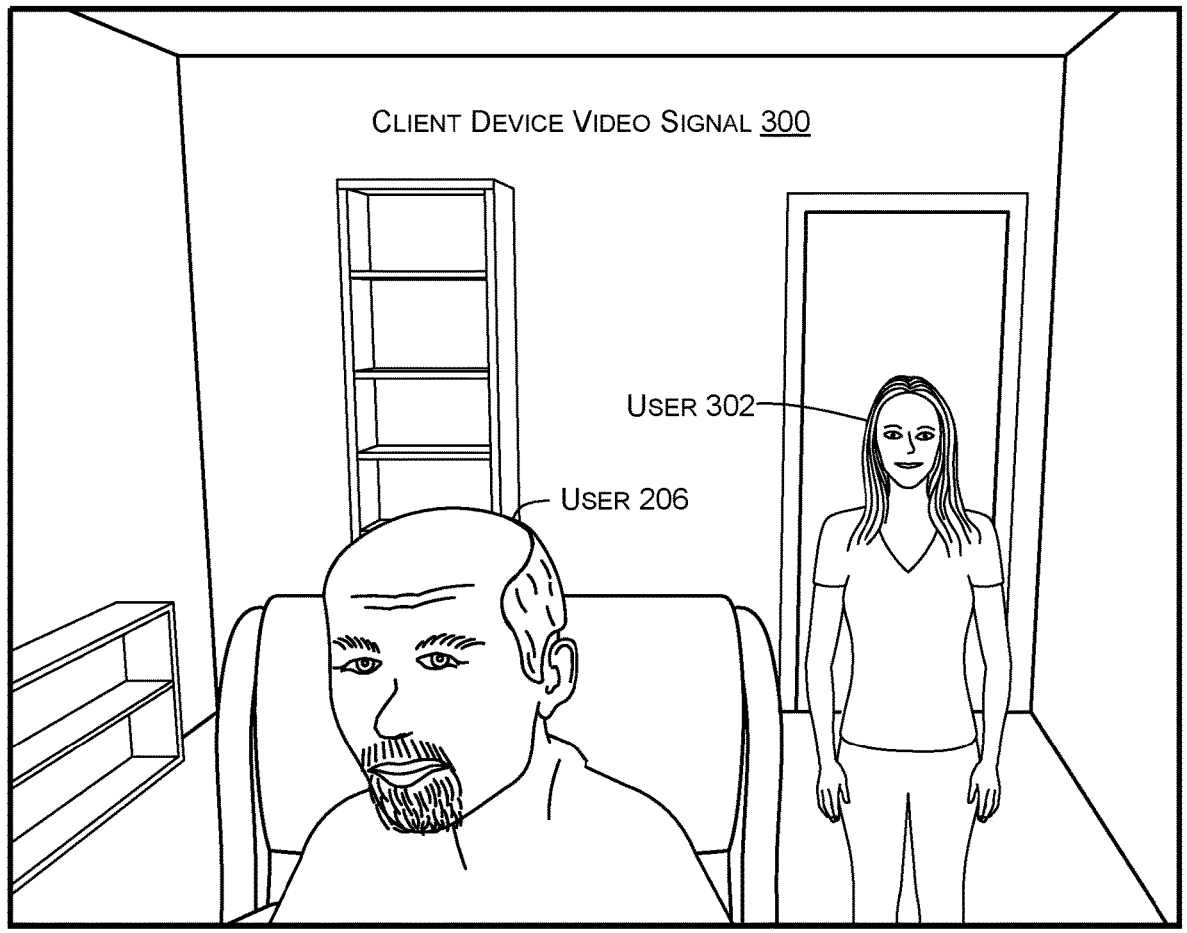
FIG. 3A-3C illustrate an example home office scenario involving active speaker detection, consistent with some implementations of the present concepts.
Figure 3B:
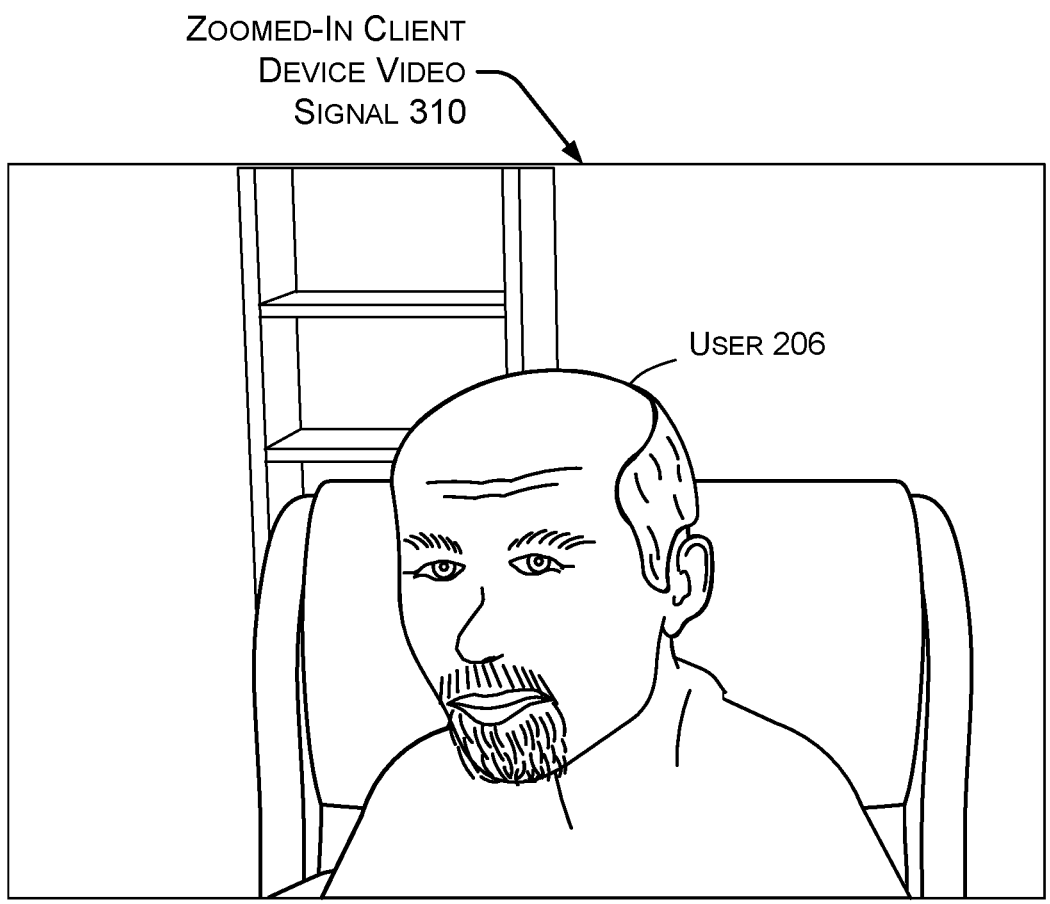
Figure 3C:
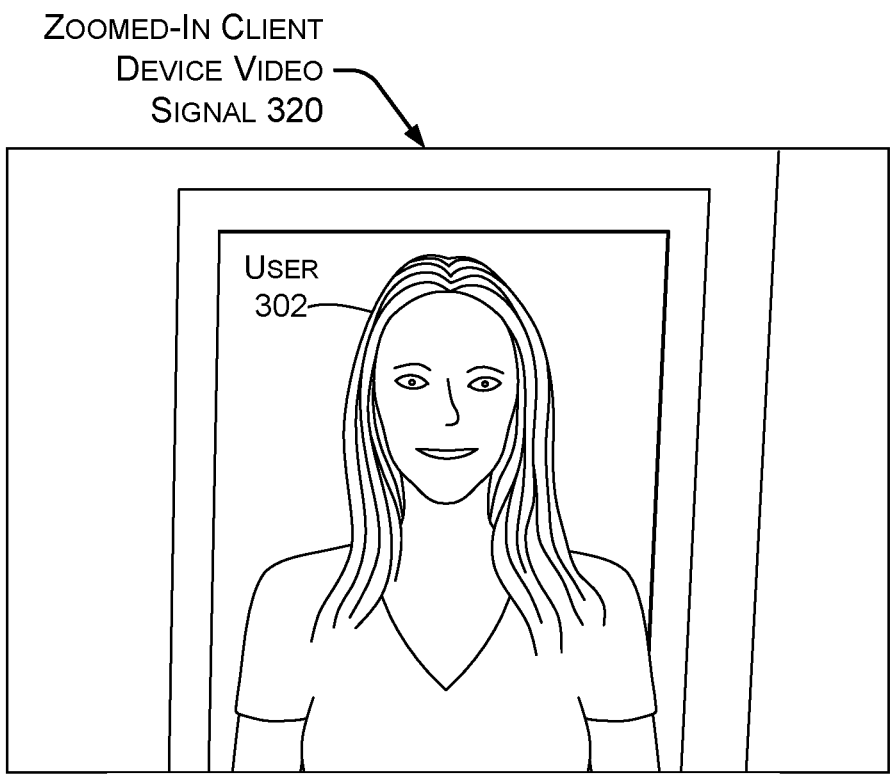

FIGS. 3A-3C collectively show a home office scenario where active speaker detection is employed to dynamically provide high-quality views of users when they speak during a teleconference. For FIGS. 3A-3C, assume that user 206 has decided to work from home and participate in another teleconference using client device 120 as a remote device.

FIG. 3A shows a client device video signal 300 captured by client device 120. User 206 is visible in the video signal, as well as user 302. Assume that neither user 206 nor user 302 is currently talking.

Next, assume that user 206 begins talking. As shown in FIG. 3B, a zoomed-in client device video signal 310 of user 206 can be captured by client device 120 responsive to detecting that user 206 is talking. For instance, the client device can perform a digital zoom action centered on the face of user 206 and send the zoomed-in client device video signal 310 to server 150 for use in a playback signal communicated to any other devices participating in the call. As one example, zoomed-in client device video signal 310 can be sent to the conference room device 140 for display within the conference room.

Next, assume that user 206 stops talking and user 302 begins talking. As shown in FIG. 3C, a zoomed-in client device video signal 320 of user 302 can be captured by the client device 120 responsive to detecting that user 302 is talking. For instance, the client device can perform a digital zoom action centered on the face of user 302 and send the zoomed-in client device video signal 320 to server 150 for use in a playback signal communicated to any other devices participating in the call. As one example, zoomed-in client device video signal 320 can be sent to the conference room device 140 for display within the conference room.

As described above, client device 120 can dynamically zoom in on different users as they begin actively speaking. Thus, other users, such as users in the conference room or other remote users working from home can view a high-resolution frontal view of the active speaker that changes as different users begin speaking. Note that the scenarios described with respect to FIGS. 3A-3C can also be implemented by zooming in on different speakers in a conference room, and using audio provided by a conference room microphone as described previously.

First Speaker Detection Architecture

Figure 4:
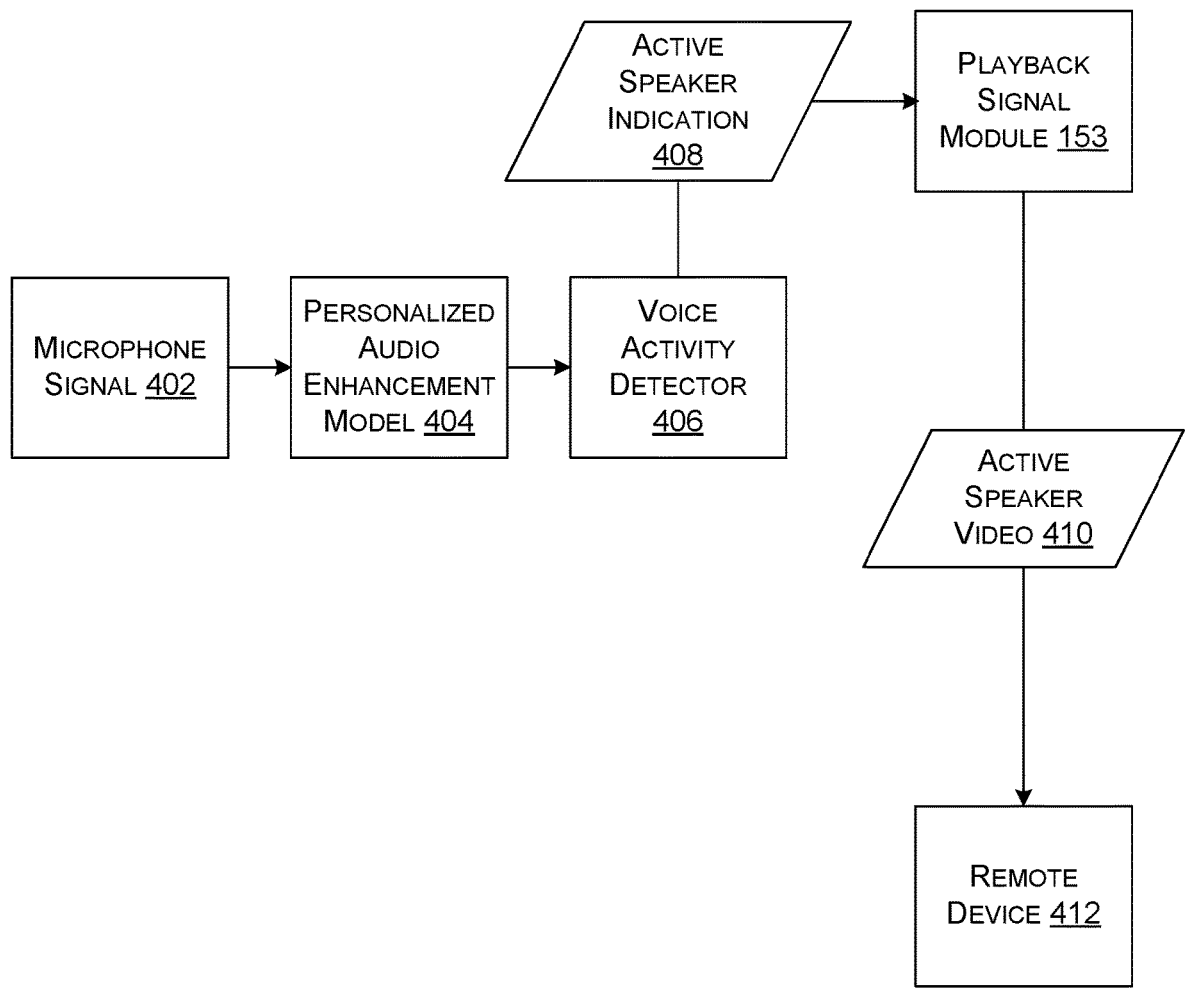
FIG. 4 illustrates a first speaker detection architecture, consistent with some implementations of the present concepts.

FIG. 4 shows a first speaker detection architecture 400 that can be employed to detect when a user is currently speaking into a given client device. A microphone signal 402 is processed by a personalized audio enhancement model 404 (e.g., locally on the client device or remotely on a server). A voice activity detector 406 processes an enhanced microphone signal output by the personalized audio enhancement model. Referring back to FIG. 1, in some implementations, the speaker detection module 114 can include the voice activity detector 406.

If a voice is detected in the enhanced microphone signal, the voice activity detector provides an active speaker indication 408 to playback signal module 153. Because the personalized enhancement module suppresses the voices of users other than a designated user (e.g., owner) of a particular client device, the presence of voice activity in the enhanced microphone signal implies that the designated user is actively speaking. The playback signal generation module can generate a playback signal that includes an active speaker video 410, which is sent to remote device 412 (e.g., any client device or the conference room device 140). Note that the playback signal can also include the enhanced microphone signal.

Second Speaker Detection Architecture

Figure 5:
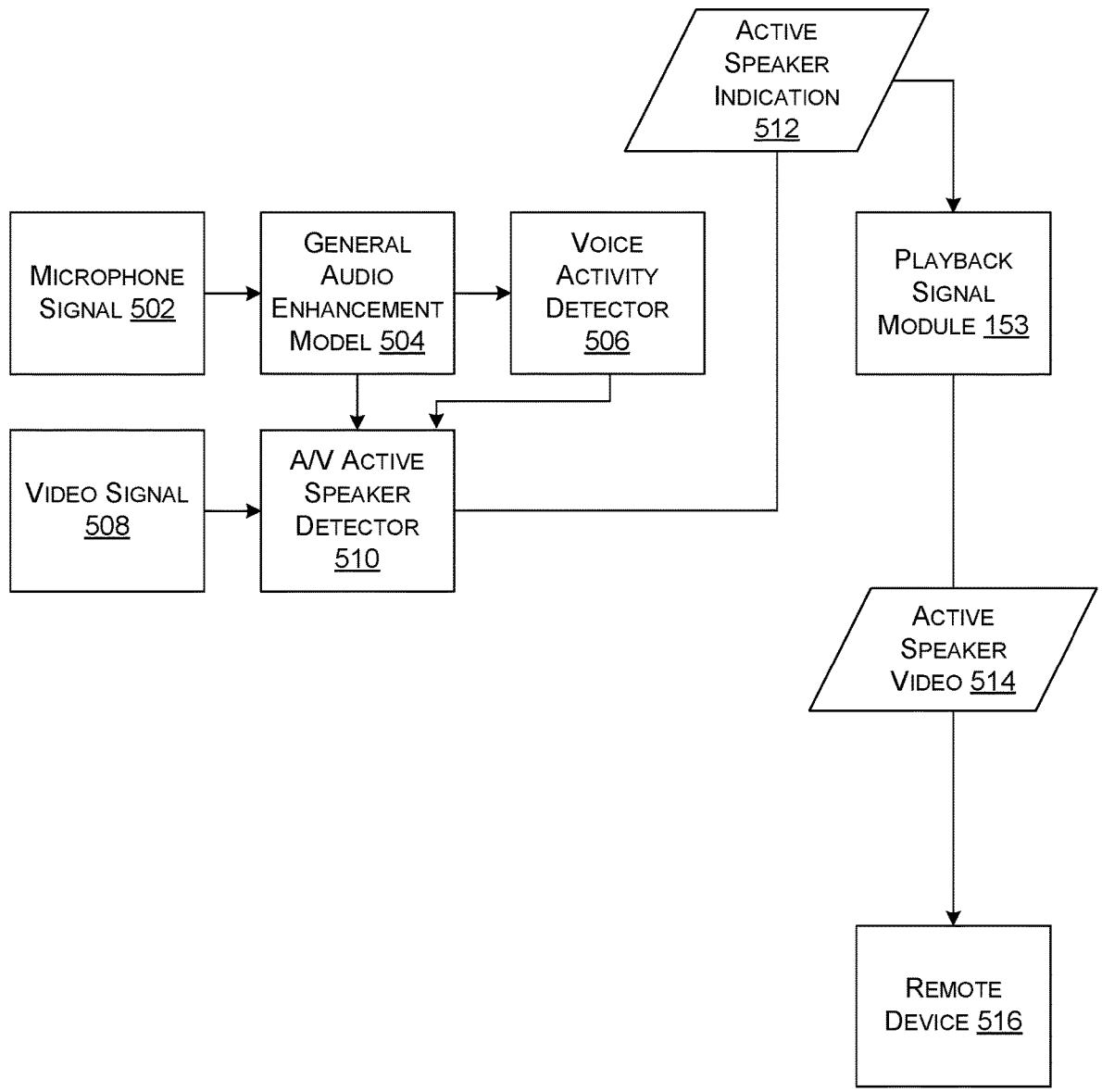
FIG. 5 illustrates a second speaker detection architecture, consistent with some implementations of the present concepts.

FIG. 5 shows a second speaker detection architecture 500 that can also be employed to detect when a user is currently speaking into a given client device. A microphone signal 502 is processed by a general audio enhancement model 504 (e.g., locally on the client device or remotely on a server). A voice activity detector 506 determines whether voice activity is detected in the enhanced microphone signal. However, in this case, the mere presence of voice activity is not sufficient to infer that a particular user is speaking, since the general audio enhancement model is adapted to allow speech by any user to pass through the model without being suppressed.

A video signal 508 is input to an A/V active speaker detector 510, which also receives an enhanced microphone signal from the general audio enhancement model 504 and a voice activity indication from the voice activity detector 506. The a/v active speaker detector (e.g., part of speaker detection module 114) processes the enhanced microphone signal and the video signal to determine whether an active speaker is present in the signals. If so, the a/v active speaker detector outputs an active speaker indication 512 to playback signal module 153. The playback signal module can generate a playback signal that includes an active speaker video 514, which is sent to remote device 516 (e.g., any client device or the conference room device 140). Note that the playback signal can also include the enhanced microphone signal.

Third Speaker Detection Architecture

Figure 6:
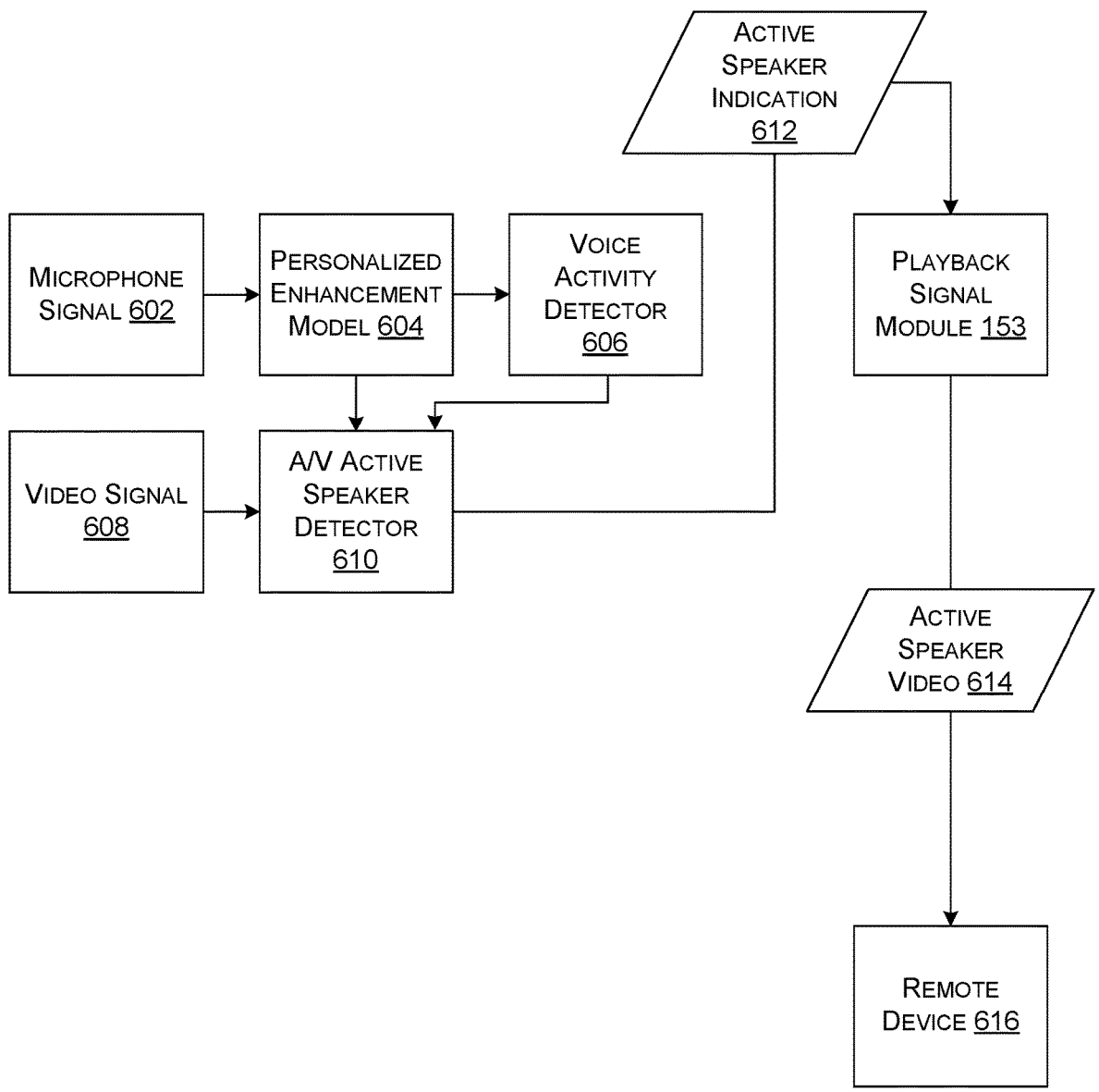
FIG. 6 illustrates a third speaker detection architecture, consistent with some implementations of the present concepts.

FIG. 6 shows a third speaker detection architecture 600 that can also be employed to detect when a user is currently speaking into a given client device. A microphone signal 602 is processed by a personalized enhancement model 604 (e.g., locally on the client device or remotely on a server). A voice activity detector 606 determines whether voice activity is detected in an enhanced microphone signal output by the personalized enhancement model.

A video signal 608 is input to an a/v active speaker detector 610, which also receives an enhanced microphone signal from the personalized enhancement model 604 and a voice activity indication from the voice activity detector 606. The a/v active speaker detector (e.g., part of speaker detection module 114) processes the enhanced microphone signal and the video signal to determine whether an active speaker is present in the signals. If so, the a/v active speaker detector outputs an active speaker indication 612 to playback signal module 153. The playback signal module can generate a playback signal that includes an active speaker video 614, which is sent to remote device 616 (e.g., any client device or the conference room device 140). Note that the playback signal can also include the enhanced microphone signal.

First Example Method

Figure 7:
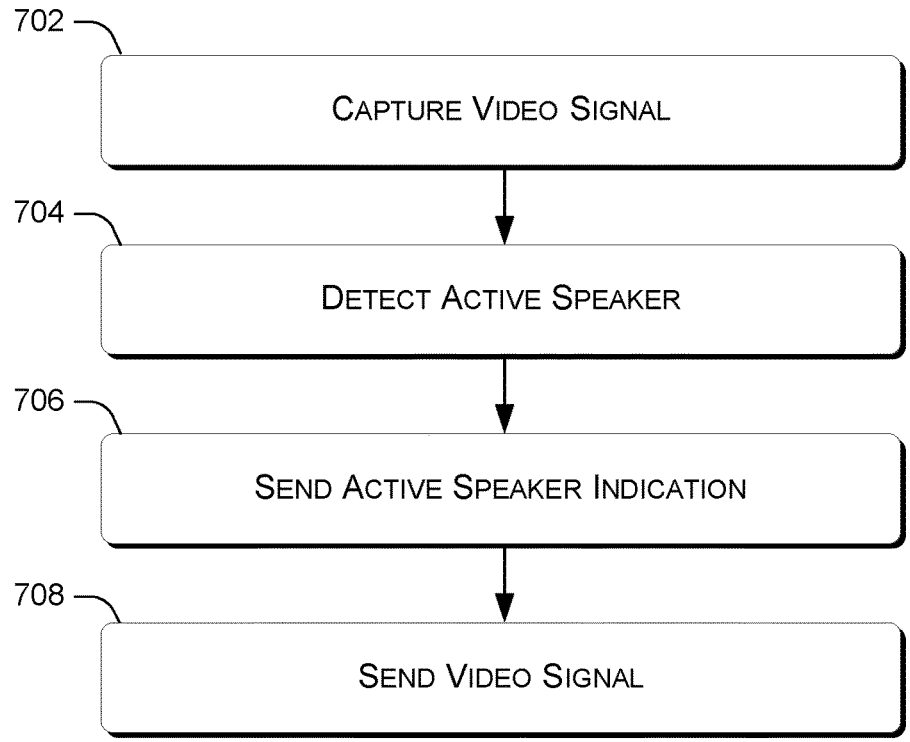
FIG. 7 illustrates an example method or technique for active speaker detection, consistent with some implementations of the disclosed techniques.

FIG. 7 illustrates an example method 700, consistent with some implementations of the present concepts. Method 700 can be implemented on many different types of devices, e.g., by one or more cloud servers, by a client device such as a laptop, tablet, or smartphone, or by combinations of one or more servers, client devices, etc.

Method 700 begins at block 702, where a video signal is captured. For instance, the video signal can be captured by a camera on a particular device that is participating in a video call with at least one remote device. In some cases, the particular device is present in a conference room with other devices participating in a call, and in other cases is located remotely from all other participating devices.

Method 700 continues at block 704, where the video signal and/or a microphone signal captured by the particular device is used to detect that a particular user is actively speaking. In some cases, block 704 involves enhancing the microphone signal to obtain an enhanced microphone signal used for the detecting. The enhancing can be performed using a general audio enhancement model, or a model that is personalized for the particular user.

Method 700 continues at block 706, where an active speaker indication is sent to another device. For instance, the active speaker indication can be sent to teleconferencing server application 151 on server 150. The active speaker indication conveys to the server application that the particular device is currently capturing video of an active speaker.

Method 700 continues at block 708, where the video signal is sent to the another device. The other device (e.g., server 150) can incorporate the particular video signal into a playback signal for playback during a call involving the particular device and at least one remote device. In some cases, the video signal is only sent when an active speaker is detected. Likewise, the microphone signal is not necessarily sent to the other device, e.g., the other device can use a conference room microphone signal for audio playback. Said another way, the microphone signal captured by the particular device can be used locally for active speaker detection but not for actual playback during the call.

In some cases, some or all of method 700 is performed by a client device. In other cases, some or all of method 700 is performed on another device, e.g., a server in communication with a client device that initially captured the video signal. As another example, co-located devices can form a distributed peer-to-peer mesh and select a particular device to perform personalized video enhancement for video signals captured by one or more of the co-located devices.

Second Example Method

Figure 8:
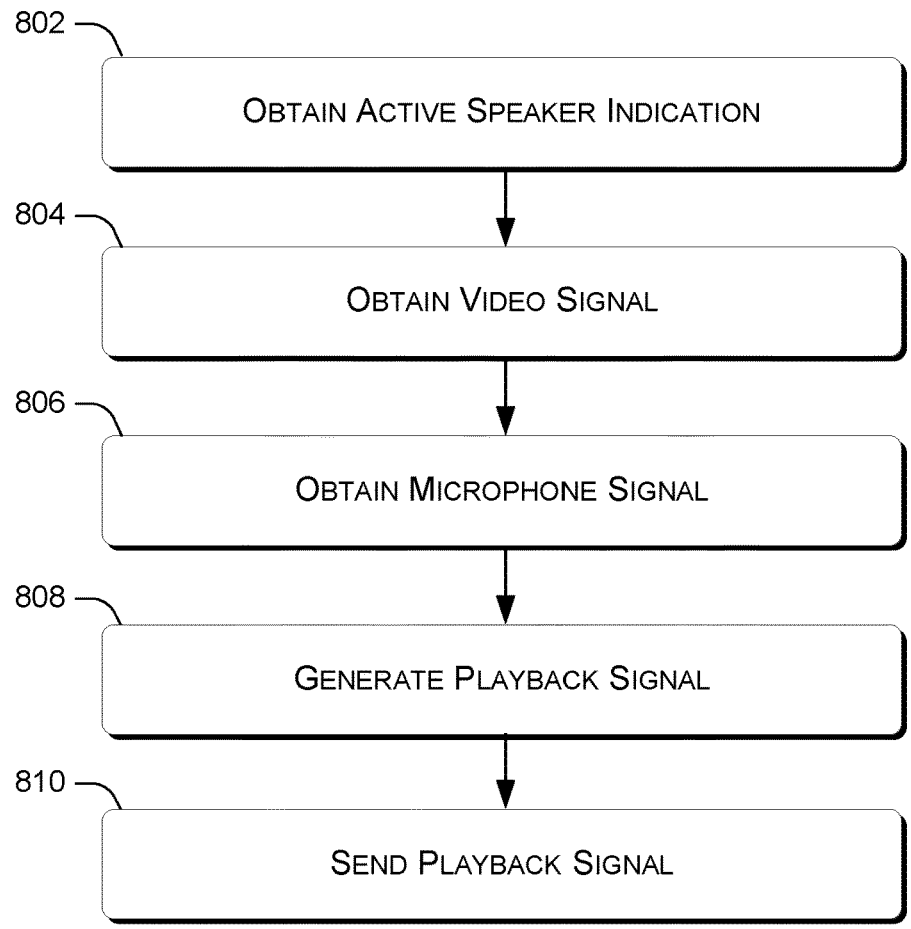
FIG. 8 illustrates an example method or technique for providing playback signals based on an active speaker indication, consistent with some implementations of the disclosed techniques.

FIG. 8 illustrates an example method 800, consistent with some implementations of the present concepts. Method 800 can be implemented on many different types of devices, e.g., by one or more cloud servers, by a client device such as a laptop, tablet, or smartphone, or by combinations of one or more servers, client devices, etc.

Method 800 begins at block 802, where an active speaker indication is received. For instance, the active speaker indication can be received from a particular device that is participating in a call. The particular device can be co-located in a conference room with other participating devices, or located remotely from the other participating devices.

Method 800 continues at block 804, where a video signal is obtained. For instance, the video signal can also be received from the particular device over a network. In some cases, the video signal can be zoomed-in to a particular user that is actively speaking.

Method 800 continues at block 806, where a microphone signal is obtained. For instance, the microphone signal can be received from another device, such as a conference room device that is co-located with the client device that sent the video signal.

Method 800 continues at block 808, where a playback signal is generated. For instance, the playback signal can include the video signal received from the client device and the microphone signal received from the conference room device.

Method 800 continues at block 810, where the playback signal is sent to a remote device that is participating in a call with the client device. Note that method 800 can be performed iteratively so that, as active speaker indications are received from different devices, different video signals of the active speakers are distributed to other participating devices.

In some cases, some or all of method 800 is performed by a remote server. In other cases, some or all of method 800 is performed on another device, e.g., the client device that initially captured the video signal. As another example, co-located devices can form a distributed peer-to-peer mesh and select a particular device to perform personalized video enhancement for video signals captured by one or more of the co-located devices.

Proximity Discovery Mechanisms

Various approaches for determining when individual client devices enter a conference room are contemplated. For instance, in some cases, users can be provided with the ability to manually indicate that they have entered a conference room to participate in a call, e.g., by a graphical user interface. As another example, in some cases, the server 150 or conference room device 140 can access user data to determine the expected location of a given user at a given time, and can infer that a given user is in a conference room for a scheduled appointment.

In other cases, location information can be employed to automatically infer that a given client device is in a conference room. For instance, in some cases, each client device can report its location to the server 150 and/or conference room device 140, as determined using local device sensors, such as Global Positioning System sensors, accelerometers, gyroscopes, or Wi-Fi based positioning. The server or client room device can then designate any devices within a specified distance threshold as co-located for the purposes of conducting a call. As yet another example, Wi-Fi or Bluetooth discovery mechanisms can be employed to estimate the distance between any two devices. As noted above, conference room device 140 can transmit a wireless beacon signal detectable by the client devices to perform proximity-based joining of individual client devices to a call.

In other cases, sound can be employed to determine whether a given client device has entered the conference room. For instance, conference room device 140 can play an audio clip at an ultrasound frequency at a designated volume, and a given client device can listen for that sound. Based on the volume of sound received by the client device, an inference can be made as to whether the client device has entered the conference room. Additional details on using ultrasound to discover nearby devices can be found in U.S. Pat. No. 9,742,780 and Borriello et al., "Walrus: Wireless Acoustic Location with Room-level Resolution using Ultrasound," in *Proceedings of the 3rd International Conference on Mobile Systems, Applications, and Services*, Jun. 6, 2005 (pp. 191-203).

Additional Implementations

As noted previously, local or remote audio enhancement of microphone signal scan be performed to remove echoes, noise, or other impairments. In some cases, audio enhancement models can be a general model that is adapted for many users. Indenbom, et al., (2022), *Deep model with built-in self-attention alignment for acoustic echo cancellation*, arXiv preprint arXiv: 2208.11308. Alternatively, audio enhancement models can be personalized to individual users, e.g., adapted to attenuate sounds other than the voice of a particular user, including the voices of other users. Eskimez, et al., (2022 May), *Personalized speech enhancement: New models and comprehensive evaluation*, In ICASSP 2022-2022 IEEE International Conference on Acoustics, Speech and Signal Processing (ICASSP) (pp. 356-360) IEEE. U.S. patent application Ser. No. 17/848,674, filed Jun. 24, 2022, also describes approaches for personalized audio enhancement, and is incorporated herein by reference in its entirety. In some cases, a personalized voice activity detection model can be employed that is trained to detect the voice of a particular user. When that user's voice is detected by a personalized voice activity detection model on a given client device, the client device can infer that the particular user actively speaking. Example personalized voice activity detection models are described at Ding, et al., (2019), Personal VAD: Speaker-conditioned voice activity detection, arXiv preprint arXiv: 1908.04284, and Ding, et al., (2022), *Personal VAD 2.0: Optimizing Personal Voice Activity Detection for On-Device Speech Recognition*, arXiv preprint arXiv: 2204.03793.

In some implementations, detecting an active speaker can also involve determining the identity of the active speaker. For instance, the identity of an active speaker can be determined using voice recognition. For instance, the voice detected by a microphone can be compared to stored vocal characteristics of one or more users to determine which user is speaking. The vocal characteristics of each user could be represented, for example, by the fundamental pitch of a given speaker, or a vector embedding representing acoustic characteristics of the user's speech.

Face detection can also be performed to detect active speakers in a video signal. For instance, face detection can be implemented as described in Viola, et al., (2001 December), *Rapid object detection using a boosted cascade of simple features*, in Proceedings of the 2001 IEEE computer society conference on computer vision and pattern recognition, CVPR 2001 (Vol. 1, pp. I-I), IEEE. For instance, a frame of the video signal can be input to a face detection model, and the face detection model can output boundaries of each face detected in that frame.

Face recognition can also be performed on detected faces to identify active speakers. For instance, a deep neural network can be employed to derive features and/or an embedding from one or more images of the user's face, e.g., Sun, et al., (2014), *Deep learning face representation from predicting 10,000 classes*, in Proceedings of the IEEE conference on computer vision and pattern recognition (pp. 1891-1898). As another example, images of a user's face can be processed to represent the user's face as a weighted combination of faces from a basis set of faces. Turk, et al., (1991 January), *Face recognition using eigenfaces*, in Proceedings 1991 IEEE computer society conference on computer vision and pattern recognition (pp. 586-587), IEEE Computer Society.

Active speaker detection from audio and video can be implemented using boosted decision trees adapted to classify users as speakers or non-speakers by pooling audio features from the enhanced microphone signal with video features from the particular video signal. Cutler, et al., (2020 May), *Multimodal active speaker detection and virtual cinematography for video conferencing*, in ICASSP 2020-2020 IEEE International Conference on Acoustics, Speech and Signal Processing (ICASSP) (pp. 4527-4531), IEEE. Zhang, et al., (2008), *Boosting-based multimodal speaker detection for distributed meeting videos*, IEEE Transactions on Multimedia, 10 (8), 1541-1552. Active speaker detection from audio and video can also be implemented using deep neural networks, e.g., a time-delay neural network adapted to correlate mouth movements in the particular video signal to sounds in the enhanced microphone signal, etc. Cutler, et al., (2000 July), *Look who's talking: Speaker detection using video and audio correlation*, in 2000 IEEE International Conference on Multimedia and Expo, ICME2000, Proceedings Latest Advances in the Fast Changing World of Multimedia (Cat. No. 00TH8532) (Vol. 3, pp. 1589-1592), IEEE. Köpüklü, et al., (2021), *How to design a three-stage architecture for audio-visual active speaker detection in the wild*, in Proceedings of the IEEE/CVF International Conference on Computer Vision (pp. 1193-1203).

Technical Effect

As noted previously, conference room video cameras have certain limitations due to their placement. Generally, users in a conference room do not look toward the conference room video camera when speaking, and the conference room video camera is often some distance away from the users and not able to capture high-resolution images of the user. By using the camera on a user device to capture a video signal, a high-resolution view of the user's face can be captured from a frontal angle.

In many cases, users will join a video conference using video only when they are present in a conference room. Nevertheless, the microphone on the client device can still be used to detect active speakers, even if the microphone signal is not actually sent to the server for playback by remote devices. This, in turn, has the effect of leveraging the microphone on the client device for active speaker detection while preserving bandwidth that would otherwise be employed to send the microphone signal to the server. In addition, the client device can send the video signal to the server only when an active speaker is detected but not at other times, thus preserving even more bandwidth.

Furthermore, active speaker detection can be used to selectively zoom into users when they are speaking during a call. Thus, remote users can focus on the face of the speaking user, even if other users are in field of view of the video camera that captured the video signal. In addition, the use of active speaker detection to selectively enable personalized audio enhancement can allow for very high-quality audio experiences. Because personalized enhancement models can be enabled dynamically as different users speak into the same device, the voices of other users and other noises can be effectively attenuated to isolate the voice of the active speaker.

Device Implementations

As noted above with respect to FIG. 1, system 100 includes several devices, including a client device 110, a client device 120, a client device 130, a conference room device 140, and a server 150. As also noted, not all device implementations can be illustrated, and other device implementations should be apparent to the skilled artisan from the description above and below.

The term "device", "computer," "computing device," "client device," and or "server device" as used herein can mean any type of device that has some amount of hardware processing capability and/or hardware storage/memory capability. Processing capability can be provided by one or more hardware processors (e.g., hardware processing units/cores) that can execute computer-readable instructions to provide functionality. Computer-readable instructions and/or data can be stored on storage, such as storage/memory and or the datastore. The term "system" as used herein can refer to a single device, multiple devices, etc.

Storage resources can be internal or external to the respective devices with which they are associated. The storage resources can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that devices generally can have input and/or output functionality. For example, computing devices can have various input mechanisms such as keyboards, mice, touchpads, voice recognition, gesture recognition (e.g., using depth cameras such as stereoscopic or time-of-flight camera systems, infrared camera systems, RGB camera systems or using accelerometers/gyroscopes, facial recognition, etc.), microphones, etc. Devices can also have various output mechanisms such as printers, monitors, speakers, etc.

Also note that the devices described herein can function in a stand-alone or cooperative manner to implement the described techniques. For example, the methods and functionality described herein can be performed on a single computing device and/or distributed across multiple computing devices that communicate over network(s) 160. Without limitation, network(s) 160 can include one or more local area networks (LANs), wide area networks (WANs), the Internet, and the like.

Additional Examples

Various examples are described above. Additional examples are described below. One example includes method performed by a particular device, the method comprising capturing a particular video signal using a particular camera of the particular device, based on at least one of the particular video signal or a particular microphone signal captured by the particular device, detecting that a particular user is actively speaking, responsive to detecting that the particular user is actively speaking, sending an active speaker indication to another device indicating that the particular user is actively speaking, and sending the particular video signal to the another device, wherein the another device incorporates the particular video signal into a playback signal for playback during a call involving the particular device and at least one remote device.

Another example can include any of the above and/or below examples where the detecting that the particular user is actively speaking comprises enhancing the particular microphone signal to obtain an enhanced microphone signal, where the detecting is performed using the enhanced microphone signal.

Another example can include any of the above and/or below examples where the enhancing is performed with a personalized audio enhancement model adapted for the particular user and the detecting is performed without the particular video signal.

Another example can include any of the above and/or below examples where the detecting comprises inputting the particular video signal and the enhanced microphone signal to an audio/video active speaker detection model adapted to detect active speakers.

Another example can include any of the above and/or below examples where the audio/video active speaker detection model comprises a neural network adapted to correlate mouth movements in the particular video signal to sounds in the enhanced microphone signal.

Another example can include any of the above and/or below examples where the audio/video active speaker detection model comprises a boosted decision tree adapted to classify users as speakers or non-speakers by pooling audio features from the enhanced microphone signal with video features from the particular video signal.

Another example can include any of the above and/or below examples where the enhancing is performed with a general audio enhancement model adapted for multiple users.

Another example can include any of the above and/or below examples where the enhancing is performed with a personalized audio enhancement model adapted for the particular user.

Another example can include any of the above and/or below examples where the method further comprises initiating sending the particular video signal to the another device responsive to detecting that the particular user is actively speaking.

Another example can include any of the above and/or below examples where the method further comprises not sending the particular microphone signal to the another device.

Another example can include any of the above and/or below examples where the method further comprises enabling personalized audio enhancement for the particular user responsive to detecting that the particular user is actively speaking.

Another example can include any of the above and/or below examples where the method further comprises in an instance when the particular user and another user are visible in the particular video signal, zooming in on the particular user while the particular user is actively speaking.

Another example can include any of the above and/or below examples where the method further comprises detecting that the another user is actively speaking and responsive to detecting that the another user is actively speaking, zooming in on the another user.

Another example includes a method comprises obtaining an active speaker indication from a particular device, the active speaker indication conveying that the particular device has detected that a particular user is actively speaking, obtaining a particular video signal from the particular device, obtaining a microphone signal from another device that is co-located with the particular device, generating a playback signal from the microphone signal and the particular video signal, and sending the playback signal to a remote device that is participating in a call with the particular device.

Another example can include any of the above and/or below examples where the method further comprises prior to receiving the active speaker indication, generating the playback signal with another video signal.

Another example can include any of the above and/or below examples where the another video signal being obtained from another device that is also participating in the call.

Another example can include any of the above and/or below examples where the another video signal being obtained from a conference room video camera co-located with the particular device.

Another example can include any of the above and/or below examples where the microphone signal being obtained from a conference room microphone co-located with the particular device and the conference room video camera.

Another example includes a device comprising a camera, a microphone, a processor, and a storage medium storing instructions which, when executed by the processor, cause the device to capture a particular video signal using the camera of the device, based on at least one of the particular video signal or a particular microphone signal captured by the microphone of the device, detect that a particular user is actively speaking, responsive to detecting that the particular user is actively speaking, send an active speaker indication to another device indicating that the particular user is actively speaking, and send the particular video signal to the another device, wherein the another device incorporates the particular video signal into a playback signal for playback during a call involving the device and at least one remote device.

Another example can include any of the above and/or below examples where the instructions, when executed by the processor, cause the device to detect that the particular user is actively speaking by inputting the particular video signal and the particular microphone signal to an audio/visual active speaker detection model.

Another example can include any of the above and/or below examples where the instructions, when executed by the processor, cause the device to detect that the particular user is actively speaking by inputting the particular microphone signal to a personalized voice activity detection model trained to detect the voice of the particular user.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A method performed by a particular device, the method comprising:
capturing a particular video signal using a particular camera of the particular device;
based on at least one of the particular video signal or a particular microphone signal captured by the particular device, detecting that a particular user is actively speaking;
responsive to detecting that the particular user is actively speaking:
sending an active speaker indication to another device indicating that the particular user is actively speaking; and
sending the particular video signal to the another device, wherein the another device incorporates the particular video signal into a playback signal for playback during a call involving the particular device and at least one remote device, and wherein the particular video signal is only sent responsive to detecting that the particular user is actively speaking.

2. The method of claim 1, wherein the detecting that the particular user is actively speaking comprises:
enhancing the particular microphone signal to obtain an enhanced microphone signal,
wherein the detecting is performed using the enhanced microphone signal.

3. The method of claim 2, wherein the enhancing is performed with a personalized audio enhancement model adapted for the particular user and the detecting is performed without the particular video signal.

4. The method of claim 2, wherein the detecting comprises:
inputting the particular video signal and the enhanced microphone signal to an audio/video active speaker detection model adapted to detect active speakers.

5. The method of claim 4, wherein the audio/video active speaker detection model comprises a neural network adapted to correlate mouth movements in the particular video signal to sounds in the enhanced microphone signal.

6. The method of claim 4, wherein the audio/video active speaker detection model comprises a boosted decision tree adapted to classify users as speakers or non-speakers by pooling audio features from the enhanced microphone signal with video features from the particular video signal.

7. The method of claim 4, wherein the enhancing is performed with a general audio enhancement model adapted for multiple users.

8. The method of claim 4, wherein the enhancing is performed with a personalized audio enhancement model adapted for the particular user.

9. The method of claim 1, further comprising:
not sending the particular microphone signal to the another device.

10. The method of claim 9, further comprising:
enabling personalized audio enhancement for the particular user responsive to detecting that the particular user is actively speaking.

11. The method of claim 1, further comprising:
in an instance when the particular user and another user are visible in the particular video signal, zooming in on the particular user while the particular user is actively speaking.

12. The method of claim 11, further comprising:
detecting that the another user is actively speaking; and
responsive to detecting that the another user is actively speaking, zooming in on the another user.

13. A method comprising:
obtaining an active speaker indication from a particular device, the active speaker indication conveying that the particular device has detected that a particular user is actively speaking;
obtaining a particular video signal from the particular device, the particular video signal is only received responsive to the active speaker indication;
obtaining a microphone signal from another device that is co-located with the particular device;
generating a playback signal from the microphone signal and the particular video signal; and
sending the playback signal to a remote device that is participating in a call with the particular device.

14. The method of claim 13, further comprising:
prior to receiving the active speaker indication, generating the playback signal with another video signal.

15. The method of claim 14, the another video signal being obtained from another device that is also participating in the call.

16. The method of claim 14, the another video signal being obtained from a conference room video camera co-located with the particular device and the microphone signal being obtained from a conference room microphone co-located with the particular device and the conference room video camera.

17. A device comprising:
a camera;
a microphone;
a processor; and
a storage medium storing instructions which, when executed by the processor, cause the device to:
capture a particular video signal using the camera of the device;
based on at least one of the particular video signal or a particular microphone signal captured by the microphone of the device, detect that a particular user is actively speaking;
responsive to detecting that the particular user is actively speaking, send an active speaker indication to another device indicating that the particular user is actively speaking; and
send the particular video signal to the another device, wherein the another device incorporates the particular video signal into a playback signal for playback during a call involving the device and at least one remote device, and wherein the particular video signal is only sent responsive to detecting that the particular user is actively speaking.

18. The device of claim 17, wherein the instructions, when executed by the processor, cause the device to:
detect that the particular user is actively speaking by inputting the particular video signal and the particular microphone signal to an audio/visual active speaker detection model.

19. The device of claim 17, wherein the instructions, when executed by the processor, cause the device to:
detect that the particular user is actively speaking by inputting the particular microphone signal to a personalized voice activity detection model trained to detect the voice of the particular user.

* * * * *